(12) United States Patent
Bürkert et al.

(10) Patent No.: US 11,489,809 B2
(45) Date of Patent: Nov. 1, 2022

(54) WIRELESS ALLOCATION OF NETWORK ADDRESSES

(71) Applicant: ebm-papst Mulfingen GmbH & Co. KG, Mulfingen (DE)

(72) Inventors: Martin Bürkert, Dörzbach-Hohebach (DE); Helmut Lipp, Dörzbach-Hohebach (DE); Thomas Sauer, Bad Mergentheim (DE); Günter Haas, Weißbach (DE); Markus Humm, Weißbach (DE); Marco Weckert, Bad Mergentheim (DE)

(73) Assignee: ebm-papst Mulfingen GmbH & Co. KG, Mulfingen (DE)

( * ) Notice: Subject to any disclaimer, the term of this patent is extended or adjusted under 35 U.S.C. 154(b) by 331 days.

(21) Appl. No.: 16/633,632

(22) PCT Filed: Jul. 25, 2018

(86) PCT No.: PCT/EP2018/070132
§ 371 (c)(1),
(2) Date: Jan. 24, 2020

(87) PCT Pub. No.: WO2019/020674
PCT Pub. Date: Jan. 31, 2019

(65) Prior Publication Data
US 2020/0186493 A1 Jun. 11, 2020

(30) Foreign Application Priority Data
Jul. 28, 2017 (DE) .................... 10 2017 117 128.2

(51) Int. Cl.
H04W 4/80 (2018.01)
H04L 61/5038 (2022.01)
(Continued)

(52) U.S. Cl.
CPC ........ *H04L 61/5038* (2022.05); *G06F 13/362* (2013.01); *H04L 12/40019* (2013.01);
(Continued)

(58) Field of Classification Search
CPC ................... H04W 4/80; G06F 13/362; G06F 2213/0002; G06F 2213/0042; H04L 12/40019
See application file for complete search history.

(56) References Cited

U.S. PATENT DOCUMENTS 8,856,413 B2 10/2014 Schultz
2005/0256939 A1 11/2005 Naismith et al.
(Continued)

FOREIGN PATENT DOCUMENTS

CN 103685386 A 3/2014
DE 29907265 U1 9/1999
(Continued)

OTHER PUBLICATIONS

European Patent Office, Rijswijk, Netherlands, International Search Report of International Application No. PCT/EP2018/070132, dated Oct. 23, 2018, 3 pages.

*Primary Examiner* — Samina F Choudhry
(74) *Attorney, Agent, or Firm* — Dickinson Wright PLLC

(57) ABSTRACT

A dynamically addressable master-slave system and a method for dynamically addressing slave units includes a master unit and a plurality of slave units, such that the slave units are interconnected with the master unit via a bus system. The respective network addresses of the slave units are assigned to the respective serial numbers of these slave units in a table in the master unit according to the position thereof in the system according to a determined order. Upon replacement of slave units, a list of serial numbers of the units to be replaced is transferred to the master unit in the (Continued)

sequence of the acquisition of the serial numbers, which master unit replaces these serial numbers in the table with the serial numbers of the replaced slave units transmitted to the master unit.

16 Claims, 2 Drawing Sheets

(51) Int. Cl.
  *G06F 13/362* (2006.01)
  *H04L 12/40* (2006.01)
  *H04L 41/0813* (2022.01)
(52) U.S. Cl.
  CPC .. *H04L 12/40078* (2013.01); *H04L 12/40169* (2013.01); *H04L 41/0813* (2013.01); *H04W 4/80* (2018.02); *G06F 2213/0002* (2013.01); *G06F 2213/0042* (2013.01)

(56) References Cited

U.S. PATENT DOCUMENTS

| 2006/0206246 A1* | 9/2006 | Walker ............... H04L 63/302 |
| | | 701/16 |
| 2010/0077254 A1 | 3/2010 | Erdmann et al. |
| 2015/0208255 A1 | 7/2015 | Belk |
| 2016/0048709 A1* | 2/2016 | Butler ............... H04L 67/1097 |
| | | 340/10.51 |

FOREIGN PATENT DOCUMENTS

| DE | 10336301 A1 | 3/2005 |
| DE | 102012107673 A1 | 5/2014 |
| DE | 102014117797 A1 | 4/2016 |
| DE | 202016104114 U1 | 8/2016 |
| DE | 102015211345 A1 | 12/2016 |
| EP | 2287689 A1 | 2/2011 |
| WO | 2013107704 A1 | 7/2013 |

* cited by examiner

WIRELESS ALLOCATION OF NETWORK ADDRESSES

CROSS REFERENCE TO RELATED APPLICATIONS

This application is a 35 U.S.C. § 371 national phase application of International Application No.: PCT/EP2018/070132, filed Jul. 25, 2018, which claims the benefit of priority under 35 U.S.C. § 119 to German Patent Application No.: 10 2017 117 128.2, filed Jul. 28, 2017, the contents of which are incorporated herein by reference in their entirety.

FIELD

The invention relates to the allocation of network addresses to devices, for example, fans, during the facility startup and in particular upon the replacement of defective devices in a facility. Furthermore, the invention relates to a facility designed as a dynamically addressable master-slave system and a method for addressing the slave units in this system.

BACKGROUND

The statements in this section merely provide background information related to the present disclosure and several definitions for terms used in the present disclosure and may not constitute prior art.

There are diverse methods for address allocation in a network in the prior art, for example, manual IP address allocation in the case of network devices (computers, printers, etc.), auto-addressing based on serial numbers, address allocation according to a defined wiring plan, or shift register address allocation. For example, DE 103 36 301 A1 proposes an automated addressing procedure. A bus-based addressing method of slave units is known from EP 2 287 689 EP.

Bus systems are used, for example, for data transmission between multiple users in a facility network. Bus systems of greatly varying types have been known for some time. The master-slave bus systems on which the present invention is based usually have the property that all slave units have to have unique network addresses to be able to be individually addressed. Individual slaves can thus be addressed individually and intentionally by means of a bus system, wherein in addition the settings of the slave can be changed or items of status information can be requested from the slave. In a facility in which devices based on serial numbers, such as motors, fans, or other units having a serial number are present, in which one or more defective devices are to be replaced, the replacement devices to be installed are to identically take over the logical addresses of the devices removed from the facility, so that the respective new device is recognized by the network as the original device and has precisely the same logical network address which the device previously located at this facility position had.

A master unit is thus capable in the case of a specific slave unit, and accordingly in the case of a replaced slave unit, of actuating a system component activated by this slave unit, or assigning received messages to such a slave unit and thus a very specific system component. To ensure such a functionality, the replaced slave unit requires, on the one hand, a system-wide unique address, on the other hand, the unique address and the association of the replaced slave unit with a system component or its position in the bus system have to be known to the master unit.

This is conventionally achieved, for example, in that an addressing or orientation phase is carried out during the initialization of a bus system. In this phase the slave units are, for example, assigned system addresses in a specific sequence, or the master unit is given the option of successively requesting stored device identifiers of individual slave units at various positions. However, in the case of a replacement of defective devices, this type of address allocation does not offer a solution for achieving the above-mentioned goal that the respective new device having a changed serial number is recognized by the network as the original device, which has a different serial number, and precisely the same logical network address now has had to be linked to a different serial number than the device previously located at this facility position had.

A master-slave system is proposed in DE 10 2014 117 797.5 A1, which is configured in such a way that at the input of the closest slave unit, a signal (signal change), which is provided by the digital output, of a serial signal sequence is detected to increase the address of the corresponding slave unit by the value "1" in each case, to store the signal change in the memory, and to output a signal corresponding to the content of the memory at the output of the memory. This addressing method has the disadvantage that a clock signal from the master is required for addressing via shift register and thus a linkage to the serial number cannot be established. A replaced device does receive the address defined in the series of the slave units, without the master unit and the central controller knowing, however, which device was installed or replaced having which specific serial number. If multiple such replacement measures take place over time, the data in the system thus no longer correspond at all to the serial numbers upon startup.

Another method is known from U.S. Pat. No. 8,856,413 B2, comprising an interface bus, an enable circuit having a switch, and two control ports, which are connected via the enable circuit. The system is configured in such a way that the address assignment is only possible when the bus interface control signal is applied to one of the ports and is thus open to control the enabling of the signal switch. Otherwise, the release circuit locks the slave unit. This method has the disadvantage that the above-described problem of the device replacement also cannot be solved thereby.

SUMMARY

Against this background, it is the objective of the present disclosure to reduce the above-mentioned disadvantages at least partially and to provide an improved method for addressing slave units in a facility network.

This objective is achieved by a method comprising a master unit and a plurality of slave units (Si), wherein the slave units (Si) have both a unique serial number (Sni) and a fixed network address (Ai) and are interconnected with the master unit via a data communication system and wherein a data assignment table ((A1, Sn1), (A2, Sn2), . . . , (Ai, Sni)) is provided in a system memory of the master unit, in which table the respective network addresses (Ai) of the slave units (Si) are assigned to the respective serial numbers (Sni) of these slave units (Si) according to the position (i) thereof in a determined order in the system, said method having the following steps:

a. acquiring the serial numbers (Sni) of the slave units (Si) to be replaced;
b. inputting the serial numbers (Sni) of the replaced slave unit (Si) in acquisition sequence at the master unit;

c. replacing the serial number (Sni) for the slave unit (Si), stored for the position (i), with the input serial number (Sni) and assigning it to the network address (Ai) for this position in the data assignment table ((A1, Sn1), (A2, Sn2), . . . , (Ai, Sni)).

The objective is further achieved by a master-slave system comprising a master unit and a plurality of slave units (Si), wherein every slave unit (Si) has both a unique serial number (Si) and a fixed network address (Ai) and is interconnected with the master unit via a data communication system and wherein a data assignment table ((A1, Sn1), (A2, Sn2), . . . , (Ai, Sni)) is provided in a system memory of the master unit, in which table the respective network addresses (Ai) of the slave units (Si) are assigned to the respective serial numbers (Sni) of these slave units (Si) according to the position (i) thereof in a determined order in the system, wherein furthermore, input means for inputting a serial number (Sni) or a list of serial numbers (Sni) of replaced slave units (Si) in the system and a data exchange module for manually or automatically replacing the serial number (Sni) stored via the input means for the replaced slave units (Si) and for assigning it to the network address (Ai) for this position in the data assignment table ((A1, Sn1), (A2, Sn2), . . . , (Ai, Sni)) are provided.

According to one aspect of the present disclosure, a method is therefore provided for addressing one or more replaced slave units in a master-slave unit, comprising a master unit and a plurality of slave units, wherein the slave units have both a unique serial number and also a fixed network address and are interconnected with the master unit via a data communication system and wherein a data assignment table is provided in a system memory of the master unit, in which table the respective network addresses of the slave units are assigned to the respective serial number of these slave units according to the position thereof in the system according to a determined order, said method comprising the following steps:

a. acquiring the serial numbers of the slave units to be replaced;
b. inputting or transmitting the serial numbers of the replaced slave unit in acquisition sequence to the master unit;
c. replacing the serial number stored for the respective positions with the serial number input for the newly installed slave unit and assigning it to the network address for this position in the data assignment table.

In the scope of the present disclosure, "replacement device," "replaced device," and "replaced slave unit" are each to be understood as the slave unit which was newly installed as the replacement for the defective and/or removed device or slave unit in the system.

For this purpose, the earlier serial number can be replaced by the serial number of the replaced, i.e., newly installed device in the data assignment table by overwriting it. Additionally or alternatively, however, the old serial number can also be written in an archive memory, so that the hardware changes of the slave units can be tracked over an acquisition time frame.

According to another aspect of the present disclosure, it is provided that the serial numbers of the replaced slave units are produced by means of camera-technology acquisition, preferably by means of photographic acquisition of the nameplates of the respective slave unit. Therefore, for example, a service technician can remove defective fans in a ventilation facility and photograph the nameplates of the newly installed fans (slave units) in the numbering sequence. The facility has originally been constructed in an ordered sequence with respect to the logical network addresses and is also supposed to be again after remedying the problem.

It is advantageously provided for this purpose according to the present disclosure that the input of the serial numbers takes place in the form of a serial number list in the sequence of the replaced slave units. Because of the identical acquisition sequence, the specific sequence of the new device serial numbers is also known and the position thereof is also known, since this position corresponds to the position of the failed and/or removed devices. The acquired new serial numbers are transmitted in the acquisition sequence to the controller of the facility, therefore preferably to the master unit.

The input in above-mentioned step b) can advantageously also be performed manually by means of an input mask, for example, by a keyboard input.

The transmission to the master unit can be performed in different ways according to the present disclosure. The input and/or transmission in step b) can be performed automatically by means of a wired data transmission of the serial numbers to the master unit. Thus, in one advantageous embodiment, an interface can be provided for this purpose, e.g., a USB, ethernet, RS485, or other suitable system interface via which the input of the serial numbers of the replaced slave unit is performed in acquisition sequence.

Alternatively, it can also be provided that the input in step b) is performed automatically by means of a wireless data transmission, preferably a radio-based, acoustic, or optical transmission of serial numbers to the master unit. For this purpose, it can advantageously be provided that the serial number of the respective affected slave unit is stored on an RFID chip for the case of a radio transmission to the master unit, which RFID chip is preferably arranged directly on or inside a housing of the respective replaced slave unit suitably designed for the wireless transmission.

Alternatively to the photographing or camera-technology acquisition of the nameplate and an optical analysis, in another embodiment of the invention, it can therefore be provided that the required information is also stored in an RFID chip in the device, wherein the terminal box cover preferably suggests itself here, which has to remain fixed at the device, however.

A functioning data transmission still has to be ensured in dependence on the housing material. In the case of a plastic cover, it can remain installed during the read out, in the case of a metal cover, it firstly has to be removed so that the radio-technology access to the RFID tag is not interfered with by the shielding action of the metal cover. The readout can be performed using a mobile RFID-capable device, for example, using a suitable smart phone having an app. In an alternative embodiment of the invention, the RFID tag can also be permanently integrated into the nameplate.

It is also to be taken into consideration here for the address allocation that every slave unit which is to be integrated into the network requires an individual access key which, according to one advantageous embodiment of the invention, is derived directly from its serial number and can therefore be ascertained by the serial number which is photographed, acquired via RFID, or acquired in another manner. For this purpose, it is proposed according to the invention that every slave unit have a network access key derived from the serial number.

In another embodiment of the present disclosure, it is provided that the master unit assigns the respective replaced (exchanged) slave unit the corresponding network address in the data assignment table and preferably communicates via this with the corresponding slave unit.

A further aspect of the present disclosure also relates, in addition to the method, to a master-slave system comprising a master unit and a plurality of slave units, wherein every slave unit has both a unique serial number and a fixed network address and is connected to the master unit via a data communication system and wherein a data assignment table is provided in a system memory of the master unit, in which table the respective network addresses of the slave units are assigned the respective serial numbers of these slave units according to the position thereof in the system according to a determined order, wherein furthermore input means are provided for inputting a serial number of replaced slave units or a list of such serial numbers and a data exchange module is provided for the manual or automatic replacement of the serial numbers stored via the input means for the replaced slave units and for the assignment to the network address for this position in the data assignment table.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

In order that the disclosure may be well understood, there will now be described various forms thereof, given by way of example, reference being made to the accompanying drawings, in which.

Figure 1:
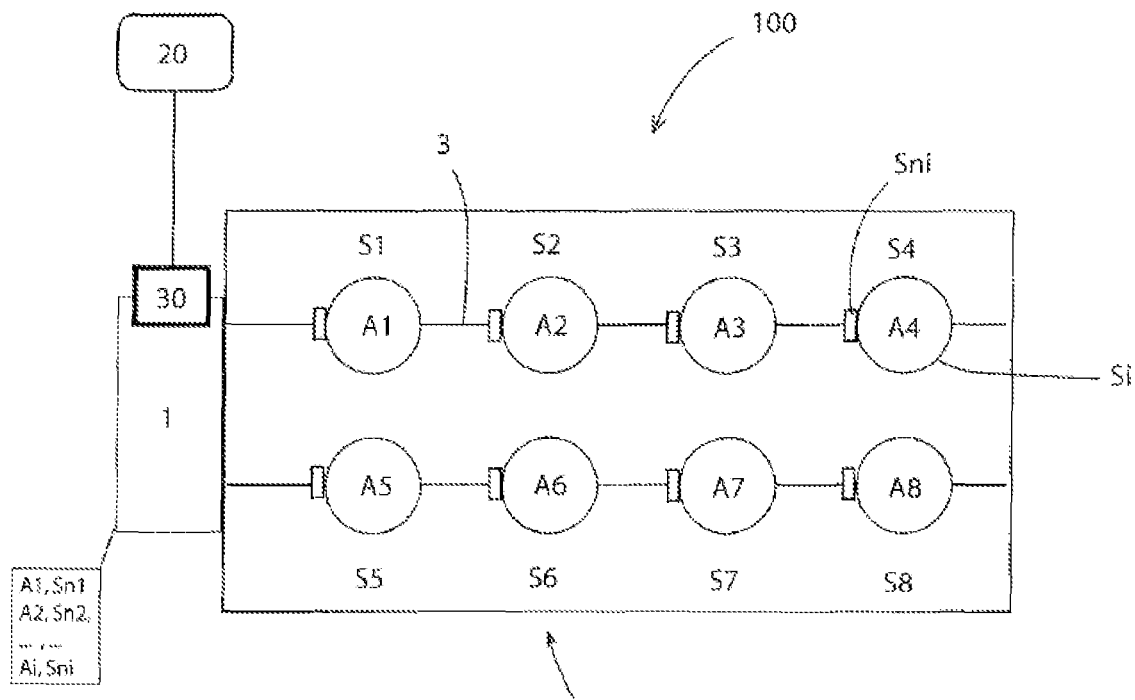
FIG. 1 shows a schematic illustration of one embodiment by way of example of a master-slave unit in a state after the startup.

The invention is described in greater detail hereafter on the basis of one embodiment by way of example with reference to FIGS. 1 to 4, wherein identical reference signs indicate identical functional and/or structural features. The drawings are provided herewith for purely illustrative purposes and are not intended to limit the scope of the present invention.

DETAILED DESCRIPTION

The following description is merely exemplary in nature and is in no way intended to limit the present disclosure or its application or uses. It should be understood that throughout the description, corresponding reference numerals indicate like or corresponding parts and features.

A schematic illustration of an exemplary embodiment of a master-slave system 100 is shown in FIG. 1. The master-slave system 100 comprises a master unit 1 (central controller) and slave units Si, wherein in this exemplary embodiment having i=8, eight fans are provided by way of example as slave units S1, . . . , S8.

Each slave unit Si has both a unique serial number Sni and a fixed network address Ai, identified here in the example by the network addresses A1, . . . , A8. The slave units Si are interconnected with the master unit 1 via a data communication system 3.

Furthermore, a data assignment table (A1, Sn1), (A2, Sn2), . . . , (Ai, Sni) is provided in a system memory of the master unit 1, in which the respective network addresses Ai of the slave units Si are assigned to the respective serial number Sni of these slave units Si according to the position thereof according to a fixed order in the system.

Figure 2:
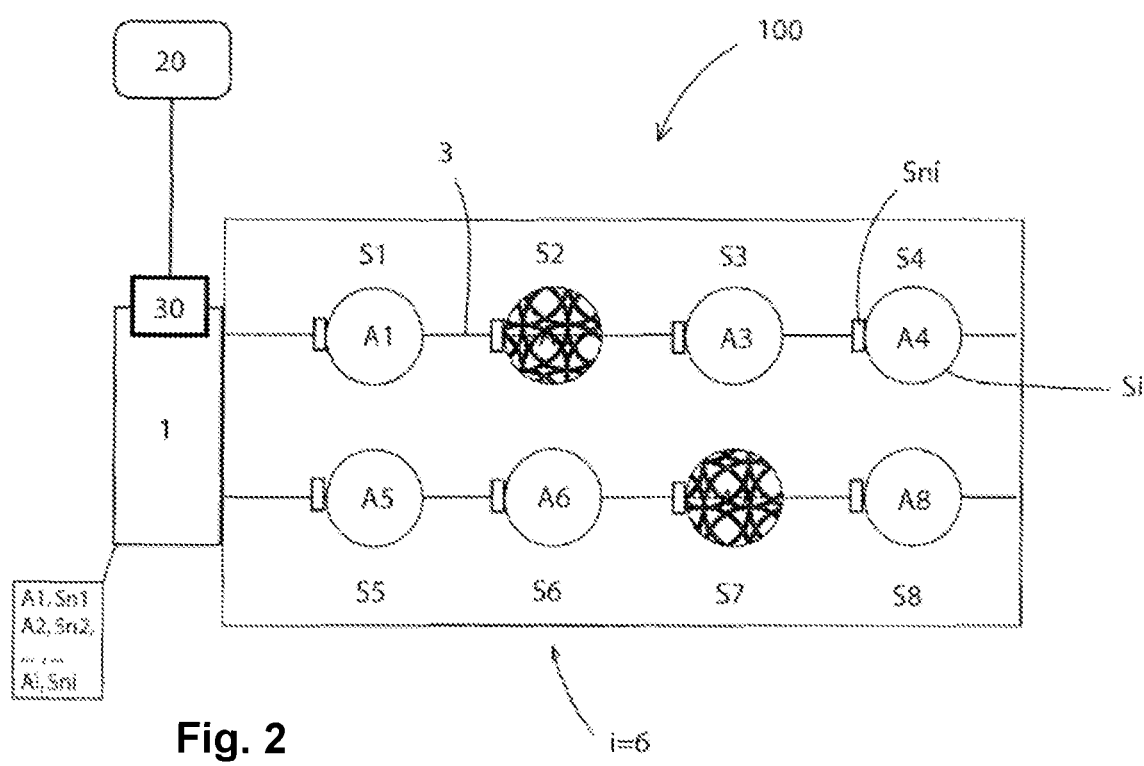
FIG. 2 shows a schematic illustration of the master-slave system according to FIG. 1 in which the slave units (S2 and S7) have failed.
Figure 3:
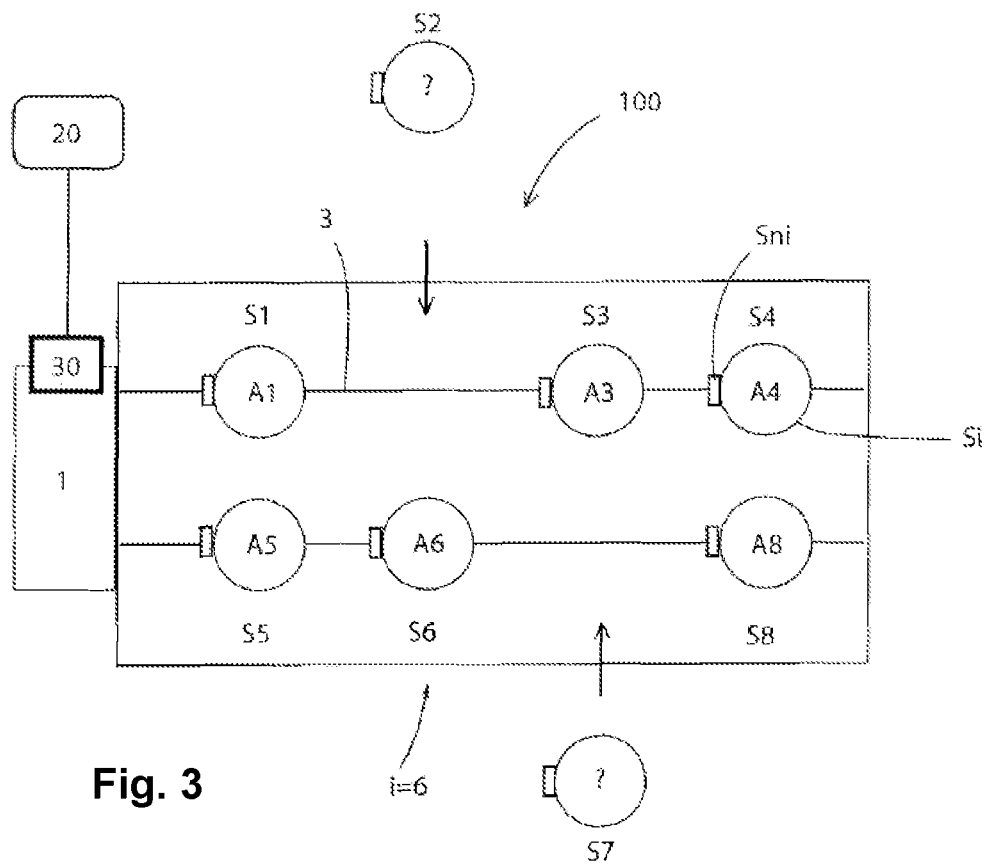
FIG. 3 shows a schematic illustration of the master-slave system according to FIGS. 1 and 2 in which the failed slave units (S2 and S7) have been removed.
Figure 4:
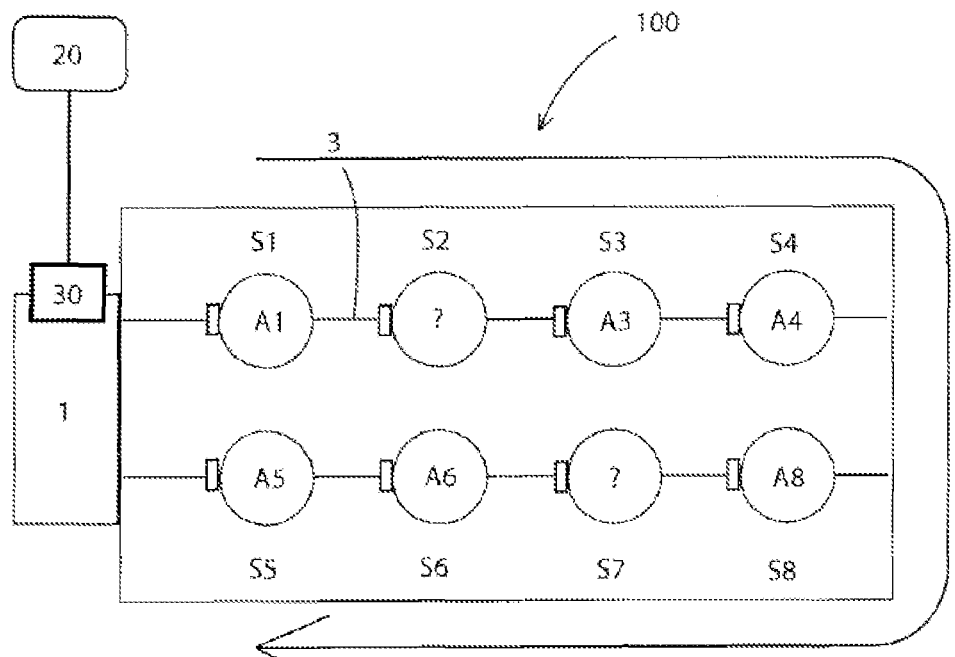
FIG. 4 shows a schematic illustration of the master-slave system in which the failed slave units (S2 and S7) have been replaced by new (replaced) slave units.

Furthermore, input means 20 are provided for inputting the serial numbers Sni for the two fans S2 and S7 to be installed. In FIG. 2, two replacement fans are shown by way of example, which are also identified by the reference signs S2 and S7, since they are supposed to be integrated in the same sequence into the system and are to receive the network addresses of the prior fans The two replacement fans S2 and S7 represent slave units, which do not yet have a network address, in this state. A schematic illustration of the master-slave system 100 according to FIGS. 1 and 2 is shown in FIG. 3, in which the failed slave units S2 and S7 have been removed, and a schematic illustration of the master-slave system 100 is found in FIG. 4, in which the failed slave units have been replaced by new (replaced) slave units S2 and S7 can receive a unique position in the system according to the acquisition sequence of the serial numbers and thus can also be assigned the corresponding network address via the acquisition sequence in the data assignment table. Furthermore, input means 20 for inputting the serial numbers Sni and a data exchange module 30 for manually or automatically replacing the serial numbers Sni stored via the input means are provided.

A number of variants are conceivable according to the present disclosure, which make use of the described solution even in embodiments which are designed fundamentally differently. Thus, for example, the type of the acquisition of the serial numbers Sni of the replaced slave units can also take place in another suitable manner, in particular via RFID tags or via other electronic storage media, which can be transmitted via an interface to the master 1.

Within this specification, embodiments have been described in a way which enables a clear and concise specification to be written, but it is intended and will be appreciated that embodiments may be variously combined or separated without parting from the invention. For example, it will be appreciated that all preferred features described herein are applicable to all aspects of the invention described herein.

While the above description constitutes the preferred embodiments of the present invention, it will be appreciated that the invention is susceptible to modification, variation and change without departing from the proper scope and fair meaning of the accompanying claims.

The invention claimed is:

1. A method for addressing one or more replaced slave units (S1, . . . , Si) in a master-slave system comprising a master unit and a plurality of slave units (Si), wherein the slave units (Si) have both a unique serial number (Sni) and a fixed network address (Ai) and are interconnected with the master unit via a data communication system and wherein a data assignment table ((A1, Sn1), (A2, Sn2), . . . , (Ai, Sni)) is provided in a system memory of the master unit, in which table the respective network addresses (Ai) of the slave units (Si) are assigned to the respective serial numbers (Sni) of these slave units (Si) according to the position (i) thereof in a determined order in the system, said method having the following steps:

a. acquiring the serial numbers (Sni) of the slave units (Si) to be replaced;
b. inputting the serial numbers (Sni) of the replaced slave unit (Si) in acquisition sequence at the master unit;
c. replacing the serial number (Sni) for the slave unit (Si), stored for the position (i), with the input serial number (Sni) and assigning it to the network address (Ai) for this position in the data assignment table ((A1, Sn1), (A2, Sn2), . . . , (Ai, Sni)).

2. The method according to claim 1, wherein the serial numbers (Sni) of the slave units (Si) to be replaced are produced by means of optical acquisition of the serial number of a nameplate of the respective slave unit (Si).

3. The method according to claim 1, wherein the input of the serial numbers (Sni) is performed in the form of a serial number list of the slave units (Si) to be replaced in the sequence of the replaced slave units (Si).

4. The method according to claim 1, wherein the input in step b) is performed manually by means of an input mask.

5. The method according to claim 1, wherein the input in step b) is performed automatically by means of a wired data transmission of the serial numbers (Sni) to the master unit.

6. The method according to claim 5, wherein the input in step b) is performed via an interface.

7. The method according to claim 1, wherein the input in step b) is performed automatically by means of a wireless data transmission of the serial numbers (Sni) to the master unit.

8. The method according to claim 1, wherein the serial number (Sni) of the slave unit (Si) is stored for the case of a radio transmission to the master unit on an RFID chip.

9. The method according to claim 8, wherein each slave unit (Si) has a network access key derived from the serial number (Sni).

10. The method according to claim 1, wherein the master unit assigns the replaced slave unit (Si) the corresponding network address (Ai) from the data assignment table ((A1, Sn1), (A2, Sn2), . . . , (Ai, Sni)).

11. A master-slave system comprising:
a master unit and a plurality of slave units (Si), wherein every slave unit (Si) has both a unique serial number (Si) and a fixed network address (Ai) and is interconnected with the master unit via a data communication system and wherein a data assignment table ((A1, Sn1), (A2, Sn2), . . . , (Ai, Sni)) is provided in a system memory of the master unit, in which table the respective network addresses (Ai) of the slave units (Si) are assigned to the respective serial numbers (Sni) of these slave units (Si) according to the position (i) thereof in a determined order in the system,
wherein, an input inputting mechanism configured to manually or automatically input a serial number (Sni) or a list of serial numbers (Sni) of replaced slave units (Si) in the system and a data exchange module for manually or automatically replacing the serial number (Sni) stored via the input means for the replaced slave units (Si) and for assigning it to the network address (Ai) for this position in the data assignment table ((A1, Sn1), (A2, Sn2), . . . , (Ai, Sni)) are provided.

12. The method according to claim 2, wherein the serial numbers (Sni) of the slave units (Si) to be replaced are produced by means of photographic acquisition of the serial number of a nameplate of the respective slave unit (Si).

13. The method according to claim 6, wherein the interface is a USB, ethernet, or RS485 interface.

14. The method according to claim 7, wherein the wireless data transmission is a radio-based, acoustic, or optical transmission.

15. The method according to claim 8, wherein the RFID chip is arranged directly on or inside a housing of the respective replaced slave unit (Si) that is suitably designed for the radio transmission.

16. The method according to claim 10, wherein the master unit assigns the replaced slave unit (Si) the corresponding network address (Ai) from the data assignment table ((A1, Sn1), (A2, Sn2), . . . , (Ai, Sni)) and communicates via this with the corresponding slave unit (Si).

* * * * *